United States Patent [19]

Bettini et al.

[11] Patent Number: 4,460,300
[45] Date of Patent: Jul. 17, 1984

[54] FASTENER WITH HEAD CAP HAVING A CONCEALED EDGE

[75] Inventors: John E. Bettini, Elgin; William J. Blucher, Addison, both of Ill.

[73] Assignee: Illinois Tool Works Inc., Chicago, Ill.

[21] Appl. No.: 338,394

[22] Filed: Jan. 11, 1982

[51] Int. Cl.³ .............................................. F16G 23/00
[52] U.S. Cl. .................... 411/375; 411/430; 411/542; 411/910; 10/86 C
[58] Field of Search ........ 411/337, 368, 369, 371–377, 411/429, 430, 542, 544, 547, 910; 10/86 C

[56] References Cited

U.S. PATENT DOCUMENTS 3,704,647 12/1972 Painaud .............................. 411/910
3,803,972 4/1974 Deutsher ............................ 411/337

FOREIGN PATENT DOCUMENTS 603494 1/1926 France ............................... 411/544

Primary Examiner—Thomas J. Holko
Assistant Examiner—Neill Wilson
Attorney, Agent, or Firm—Thomas W. Buckman; David I. Roche

[57] ABSTRACT

This invention relates to a screw type fastener having a radially enlarged driving head and a thin walled head conforming cap having a skirt which is designed to be folded inwardly beneath the head in a lapped condition beneath the head to conceal the exposed edge of the skirt between an exposed clamping surface of the cap and the under surface of the head of the fastener.

5 Claims, 5 Drawing Figures

FASTENER WITH HEAD CAP HAVING A CONCEALED EDGE

BACKGROUND AND SUMMARY OF THE INVENTION

This invention relates primarily to fasteners of a composite nature where a cap of a thin walled metallic material is designed to conform closely to and about the head of the fastener. More particularly the invention is directed to a fastener which is designed to be associated with a resilient sealing washer.

Inventions of this general type are well known and the best example of such prior art devices is that shown in U.S. Pat. No. 3,803,972. This patent describes a composite fastener with a cap of a particular material which is corrosion resistant and which is further designed to eliminate electrolytic corrosion between the carbon steel or zinc fasteners and the materials that they are secured to.

Fasteners of the type shown in this patent and elsewhere in the prior art typically include a shirt which is bent over and crimped beneath the fastener head. Obviously this reduces the diameter of the skirt portion of the cap significantly and causes the radial innermost edge of the bent over cap to be sheared and wrinkled and otherwise present jagged edges to an associated washer which is positioned beneath the head. Thus when the fastener combination of the cap, fastener and washer are torqued down to seating position, the ragged edges of the cap beneath the head of the screw cause the washer to be damaged. This damaged washer thus loses its sealing capabilities.

Accordingly this invention eliminates the problems of the prior art by lapping the inner margins of the skirt so that there is a double thickness beneath the head which creates a somewhat deeper pocket for better washer retention as well as creating a smooth radial inner edge for the washer to freely spin during seating without ripping or distorting the washer. The lapped edge further enhances the cap retention by eliminating certain spring action that occurs in a single layer version.

Other features and advantages of the invention will become apparent from the following description and upon reference to the drawings in which.

DETAILED DESCRIPTION OF THE PREFERRED EMBODIMENT

Figure 1:
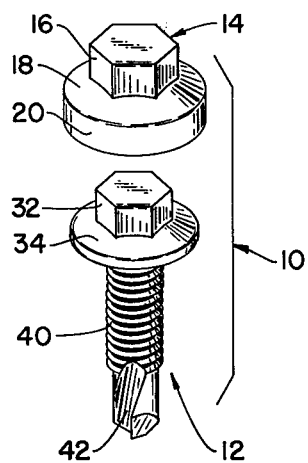
FIG. 1 is a perspective, exploded view of a screw type fastener and an associated cap for the fastener.

A typical composite fastener of the type to be improved by this invention is shown in FIG. 1 wherein the fastener unit 10 is shown to comprise a screw type fastener 12 with an enlarged head 32, a radially extending flange 34 and a threaded shank 40 which preferably terminates with a drill type point 42. A cap member 14 is designed to be closely complimentary to the head 32 in all respects and includes a head receiving cavity 16, a flange receiving region 18 and an axially extending skirt 20 which is designed to be folded under the head.

Fasteners of this type have the advantage of being able to be assembled, using the desirable qualities of the threaded fastener, namely carbon steel, to permit hardening and to thus permit a thread forming feature and/or a self drilling feature to be included therein as well as permitting a corrosive resistant feature to be relatively easily assembled on the exposed surfaces of the fastener, namely at the head. Thus the cap 14 can be of a variety of corrosive resistant materials such as stainless steel, aluminum magnesium or alloys of these materials which are capable of being accurately formed into surface mating contact with head surfaces of the fastener.

In the embodiments shown, the head is configured to have a plurality of polygonally arranged external driving surfaces 33, however, it should be understood that features of this invention could be used with internal drive surfaces as well and still be within the spirit and scope of the invention.

Figure 2:
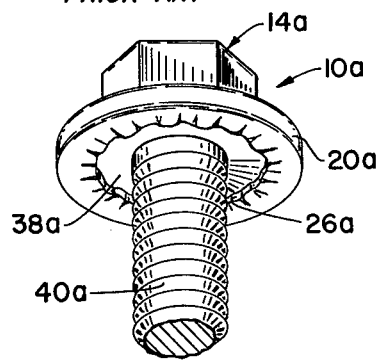
FIG. 2 is a perspective view of a prior art composite fastener.

Turning to FIG. 2, the deficiencies of prior art assemblies will be readily apparent from an analysis of fastener 10a. As a cap 14a on the composite fastener 10a is assembled about the head of the fastener, the axial skirt region 20a of the cap is bent over and crimped beneath the head which requires the resulting diameter of the edge 26a of the skirt to be appreciably less than the original diameter of the edge of the skirt. This results in wrinkles, jagged edges, etc. shown at 26a, beneath the head of the fastener 10a. Obviously when a sealing washer is associated beneath the head of this fastener and the fastener is tightened, the sealing washer will be subject to the abrasion and cutting of these edges which not only creates cosmetically undesirable features but functionally inadequate features in that the sealing washer is at times virtually destructed.

Figure 3:
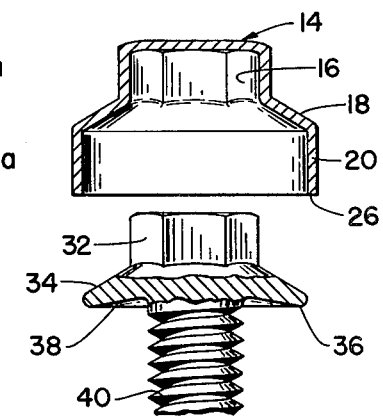
FIG. 3 is an exploded view, partly in cross section, of a fastener and cap assembled in accordance with this invention.
Figure 4:
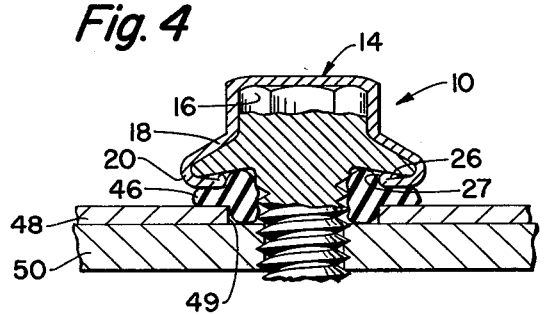
FIG. 4 is an assembly, in partial cross section, utilizing the composite fastener of this invention.
Figure 5:
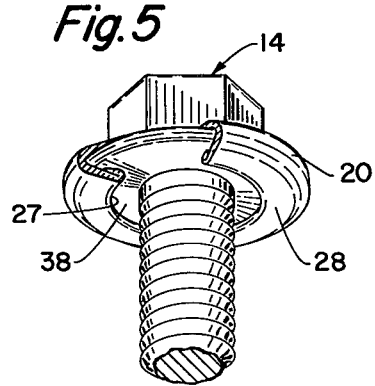
FIG. 5 is a partially cut away perspective view of a composite fastener in accordance with this invention.

With this as background, the advantages of the present invention will become apparent from FIGS. 3, 4 and 5. In FIG. 3, it will be shown that the axial extent of the skirt 20 may be substantially equal to the radial extent of the undersurface of the head of the fastener. However, as shown more particularly in FIGS. 4 and 5, the axial extremity 26 of the skirt is folded over presenting a lapped, juxtaposed configuration in the innermost regions of the skirt which is clamped beneath the head of the fastener. This provides a smooth, double thickenss edge 27 beneath the head of the fastener with the sharp edge 26 being concealed between the head of the fastener and the exposed margin 28 of the skirt.

A further desirable feature of the fastener is the use of a recess 38 beneath the head. The combination effect of the lapped over or juxtaposed hem of the skirt in cooperation with the recess 38 provides a better and more reliable retention of a sealing washer 46 on the fastener, both prior to compression and during compression. The recess also creates a marginal clamping surface 36.

As shown in FIG. 4, the environment in which this fastener is particularly designed to be effective is typically a joining of a pair of panels 48 and 50. An uppermost panel may have a clearance hole 49, while a lowermost panel may or may not have a preformed hole, depending on whether the fastener is provided with a drilling point. The sealing washer 46 is shown to be compressed within the recess which is now provided with an outer wall created by the smooth double thickness edge hem 26. However, more importantly, this innermost radial extremity of the skirt 20 is entirely free of jagged edges and permits the washer to free spin upon application of torque.

The combination effect of the double thickness or hemmed region of the cap beneath the head and situated within the recess with a resilient elastomeric washer insures that the exposure of any region of the fastener per se to the environment is eliminated. This is due to the fact that the cap itself will not damage the washer.

While the invention has been described in conjunction with a specific embodiment, it is evident that many alternatives, modifications and variations will be apparent to those skilled in the art in light of the foregoing description. Accordingly it is intended to embrace all such alternatives, modifications and variations as fall within the spirit and broad scope of the appended claims.

I claim:

1. A composite screw type fastener having a threaded shank and an integral driving head which includes a rotation inducing surface and a radially extending circumferential flange, the radial outermost region of the undersurface of said flange providing a clamping surface, a predetermined radial distance being defined between the radial outermost extremity of the flange and the shank, a cap member of relatively thin, substantially uniform thickness, corrosion resistant metal material of a size and shape to be complementary to the head, including the rotation inducing surfaces and radially extending flange providing close surface to surface contact between the head and cap member, the undersurface of the fastener including an annular recess spaced radially from the clamping sruface, the cap member including a circumferential skirt region of a predetermined axial dimension and of a diameter substantially equal to the diameter of the radially extending flange, the skirt region being folded under the clamping surface, a hemmed portion thereof being folded radially inwardly providing a lapped extremity of double thickness beneath the clamping surface with the free extremity situated between the clamping surface of the fastener and the outermost layer of the lapped extremity of the skirt, and said free extremity thereby being concealed.

2. The fastener of claim 1 including a resilient sealing washer situated beneath the clamping surface, surrounding the upper region of the threaded shank.

3. The fastener of claim 1 wherein the fastener is of carbon steel material and includes a drill tip.

4. The fastener of claim 1 wherein the driving head rotation inducing surfaces are external polygonal wrenching surfaces.

5. The fastener of claim 1 wherein the predetermined axial dimension of the skirt region of the cap member is substantially equal to the predetermined radial extent beneath the fastener head.

* * * * *